(12) United States Patent
Brown et al.

(10) Patent No.: US 6,840,659 B2
(45) Date of Patent: Jan. 11, 2005

(54) TRANSITION REGION BETWEEN A VEHICLE ENGINE HOOD OR FRONT TRUNK LID AND A HEADLIGHT

(75) Inventors: Garry Brown, Nuneaton (GB); Thomas Frank, Stuttgart (DE); Klaus Rathje, Hildrizhausen (DE); Oliver Tomlin, Leicestershire (GB); Maya Ziegs, Ammerbuch (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/265,157

(22) Filed: Oct. 7, 2002

(65) Prior Publication Data

US 2003/0099110 A1 May 29, 2003

(30) Foreign Application Priority Data

Oct. 5, 2001 (DE) .......................................... 101 49 120

(51) Int. Cl.[7] ................................................ B60Q 1/00
(52) U.S. Cl. ........................ 362/487; 362/496; 362/506; 362/507; 362/512; 362/546; 362/549; 362/485
(58) Field of Search ................................ 362/487, 496, 362/507, 512, 546, 549, 485, 506

(56) References Cited

U.S. PATENT DOCUMENTS 3,869,164 A  3/1975  Schwenk .................... 293/63
4,359,120 A  11/1982  Schmidt et al. ........... 180/69 R
4,916,589 A  * 4/1990  Nakamura et al. .......... 362/549
5,706,908 A  1/1998  Sakai et al.
6,042,255 A  3/2000  Kibayashi
6,471,386 B2 * 10/2002  Oh ............................. 362/549

FOREIGN PATENT DOCUMENTS

| DE | 2711339 A1 | 9/1978 |
|---|---|---|
| DE | 2711338 B2 | 12/1980 |
| DE | 3108059 A1 | 10/1982 |
| DE | 3802204 A1 | 8/1988 |
| DE | 3728752 C1 | 12/1988 |
| DE | 19959892 A1 | 6/2001 |
| EP | 0509690 B1 | 11/1995 |
| EP | 1048895 A1 | 11/2000 |
| EP | 1078826 A1 | 2/2001 |
| EP | 1 120 309 A2 | 8/2001 |
| FR | 2710592 | 4/1995 |
| FR | 2 710 592 A1 | 4/1995 |
| GB | 2042706 A | 9/1980 |

* cited by examiner

Primary Examiner—Stephen Husar
Assistant Examiner—B. Zeade
(74) Attorney, Agent, or Firm—Crowell & Moring LLP

(57) ABSTRACT

A transition region between an engine hood or front trunk lid and a headlight is configured such that the front hood or trunk lid and the headlight adjoin each other without any support to the greatest possible extent. Thus, in the case of a collision with a pedestrian, the front hood or trunk lid can be deformed without any support. In addition, the headlights are arranged outside a zone which is highly likely to be struck by a child's head.

20 Claims, 1 Drawing Sheet

TRANSITION REGION BETWEEN A VEHICLE ENGINE HOOD OR FRONT TRUNK LID AND A HEADLIGHT

BACKGROUND AND SUMMARY OF THE INVENTION

This application claims the priority of Application No. 101 49 120.4-31 filed in Germany on Oct. 5, 2001, the disclosure of which is expressly incorporated by reference herein.

The invention relates to the transition region between a passenger vehicle headlight and a front region which can be swung upwards, of an engine hood or trunk lid.

With regard to the protection of pedestrians in collisions with motor vehicles, the front region of said motor vehicles should be of flexible design in order, by means of energy-absorbing deformation of vehicle parts, to reduce the occurrence of shock loads on the pedestrian during accidents.

Since headlights have to be designed as comparatively stiff and heavy subassemblies, in order to ensure the desired lighting qualities, the abovementioned requirement can be satisfied technically only with difficulty.

The prior art has not to date provided any convincing solutions.

According to French Patent Document No. FR 2 710 592 A1, provision is made to use the headlight housings, which are typically mounted in a stable manner capable of bearing a load, as load-bearing parts for the front hood of a passenger vehicle, i.e. the front region, which can be swung upwards, of the front hood is supported directly on the headlight housings via buffers in the closed state of the hood.

It is known from German Patent Document No. DE 38 02 204 A1 (corresponding to U.S. Pat. No. 4,867,906) to fasten the headlight within the bodywork on mounts which can be deformed comparatively easily, and, over the entire edge region of the headlight within the bodywork, to provide a clearance into which the headlight can dip in the case of a collision. Nevertheless, the headlight represents a considerable risk of injury to a pedestrian in the event of a collision with the vehicle because unavoidably high forces of inertia occur in a collision with the pedestrian due to the weight and the mass of the headlight, which forces lead to a high shock load on the pedestrian.

German Patent Document No. DE 27 11 339 A1 shows a front hood having a pivot bearing arranged on the front hood edge, i.e. the rear hood part in the longitudinal direction of the vehicle is designed such that it can be swung open. In this case, the pivot bearing is to be arranged in a flexible manner, so that the hood is able to be displaced towards the vehicle rear in the case of a collision of the vehicle with a pedestrian. High forces of inertia also have to be accepted here, said forces leading to a high shock load on the pedestrian in the case of a collision of the vehicle with a pedestrian. The pivot bearings of the hood have otherwise to withstand high loads during the normal driving mode, for example due to vibrations and wind forces, and so the mounting of the hood is to be designed to be comparatively stiff and inflexible.

A similar arrangement is the subject matter of European Patent Document No. EP 0 509 690 B1 (corresponding to U.S. Pat. No. 5,263,546), and the abovementioned disadvantages are thus also present here.

According to German Patent Document No. DE 37 28 752 C1 (corresponding to U.S. Pat. No. 4,860,173), provision is made to design the fastening frame of the front cap of the headlight to be stiff, but to secure it in a flexible manner. In this manner, the risk of cutting injuries to the pedestrian can be reduced. However, a comparatively stiff impact surface has to be accepted.

The same applies to the front cap of the headlight of European Patent Document No. EP 1 048 895 A1. An edge bead is integrally formed here on the front cap, said edge bead being adjoined by a web, which is connected to the headlight housing and is substantially vertical with respect to the front cap, with a flexibly designed transition region on the edge bead.

According to European Patent Document No. EP 1 078 826 A1, it is known to mount the engine hood of a passenger vehicle in such a manner that it rears up in the case of a collision with a pedestrian and forms a deformable shield in front of the windscreen of the vehicle.

A construction which is similar in principle is the subject matter of German Patent Document No. DE 27 11 338 B2, in which provision is made to arrange an airbag in front of the windscreen below the rear region, which can be swung upwards, of the front hood, the said airbag lifting up the hood in a collision of the vehicle. There is nevertheless a high risk of injury for a pedestrian in the case of a collision with the vehicle due to the stable pivot mounting of the front region of the hood.

U.S. Pat. No. 5,706,908 shows advantageous constructions for deformable edge regions of adjacent bodywork parts.

It is known from German Patent Document No. DE 199 59 892 A1 to arrange, at the side of a front hood, bodywork flanks which are flexible sideways, in order to avoid an excessively stiff support of the longitudinal edges of the hood if a person strikes against the curved front hood and presses its longitudinal edges to the side.

U.S. Pat. No. 6,042,255 shows the design of headlights having very large front glass surfaces which are drawn into the bodywork flank or upper side of the bodywork. The headlight housing has a cap-shaped design, the headlight bulbs being accommodated in a cup-like central part of the housing. The edge of this central part is adjoined by stable flange surfaces which are arranged tightly below those front-cap parts of the headlight which are drawn into the bodywork flank or upper side of the bodywork. The headlight housing therefore forms a stable structure over a large surface.

It is known from British Patent Document No. GB 20 42 706 A (corresponding U.S. Pat. No. 4,329,738) to design rearwardly inclined front caps of headlights in a stepped manner in order to reduce scatter losses.

An object of the invention, then, is to significantly reduce the risk of injuries to a pedestrian in the case of a collision with a passenger vehicle in the region of the headlights, and nevertheless to provide a relatively great amount of design freedom for the bodywork. This object is achieved in a transition region of the type specified at the beginning by a headlight housing arranged in front of and below a crossmember of a bodywork structure and connected to the crossmember by a mount, a shell-like inner part of the hood, which part is arranged in the front region of the hood below the crossmember, can be supported on the crossmember via buffers and introduces supporting forces occurring at the buffers into the hood over a large area, a large clearance remaining between the lower side of the inner part and upper part of the headlight housing, which clearance is closed to the front via a wide and softly bending edge zone of the hood and/or by a thin and easily destructible, upwardly drawn wall part of the front cap of the headlight, in each case with the front edge of the hood and headlight front adjoining each other without any support.

The invention is based on the general concept of optimizing front bodywork regions, which, in the case of a collision with a pedestrian, in particular with a child, are typically encountered by the person's head, from the point of view of reducing to the greatest possible extent the risk of injury to the head, and of designing them to be correspondingly flexible and energy-absorbing. In particular, the front edge of the engine hood and the headlight front adjoin each other without any support, specifically in such a manner that there is a large clearance for deformations of the bodywork above the headlight housing. This ensures that a desirable deformation of the engine hood in the case of an accident with a pedestrian is possible in a virtually unrestricted manner, and the headlight cannot form an annoying structure obstructing the deformation of the hood.

Provision may additionally be made according to certain preferred embodiments of the invention to arrange the headlight outside a zone which, in the case of a collision of the vehicle with a child or a person, is highly likely to be struck by the child's or person's head.

It is ensured, in particular, that the front edge of the front trunk lid or engine hood can slide past the lens in the region of the light unit and a necessary path of deformation is opened up or is free.

In this connection, it is expediently provided according to certain preferred embodiments of the invention to continue the headlight front under the front edge of the front hood or lid in the manner of a ramp which rises towards the vehicle rear and on which the front edge of the hood or lid is able to slide downwards when being deformed.

Furthermore, it has proven advantageous to provide according to certain preferred embodiments of the invention, behind the upper edge of the headlight, a clearance which extends towards the vehicle rear and downwards, for a deformation of the front edge or front region of the hood or trunk lid, which deformation is unobstructed by supports.

Otherwise, with regard to preferred features of the invention, reference is made to the claims and to the following explanation of the drawing which is used to describe particularly preferred embodiments of the invention in greater detail.

Other objects, advantages and novel features of the present invention will become apparent from the following detailed description of the invention when considered in conjunction with the accompanying drawings.

DETAILED DESCRIPTION OF THE DRAWINGS

Figure 1:
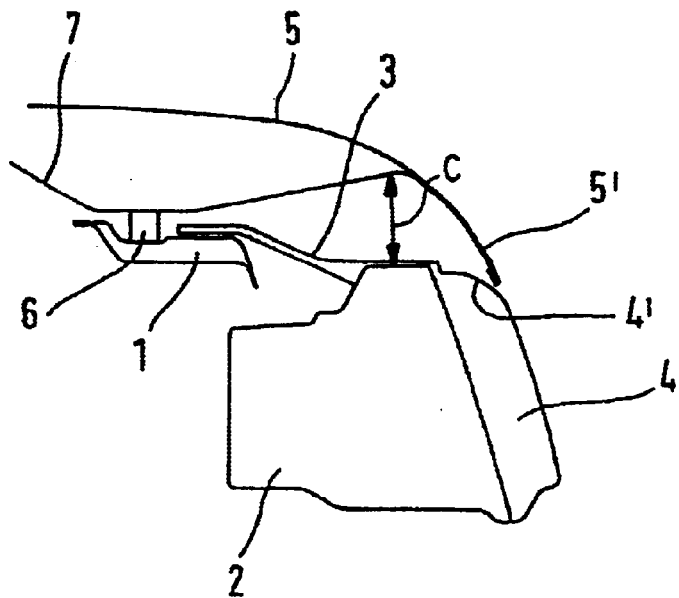
FIG. 1 shows a schematized longitudinal section with a vertical sectional plane extending in a longitudinal direction of a vehicle, in a region of a transition region between an engine hood or front trunk lid and headlight, according to a first embodiment of the invention.

According to FIG. 1, a bodywork crossmember 1, which is composed in a known manner of sheet-metal profiles, is arranged in a front region of a bodywork of a passenger vehicle and is part of the load-bearing bodywork structure. Arranged at a distance in front of and below this crossmember 1 is a housing 2 of a headlight which is connected to the crossmember 1 by means of a mount 3 and a front side of which is formed in a basically conventional manner by means of a lens or clear glass cap 4.

The front region of an engine hood or front trunk lid 5 (only part of which is illustrated), which is arranged in a manner such that it can be swung upwards on, as a rule, hinge-like pivot bearings (not illustrated), rests on the crossmember 1. In the closed state which is illustrated, the engine hood or front trunk lid 5 is supported resiliently on the crossmember 1 via buffers 6. The buffers 6 can be arranged on the hood or trunk lid 5 or—preferably—on the crossmember 1.

Above the bodywork crossmember 1, the engine hood or front trunk lid 5 has, for reinforcing purposes, a shell-like inner part 7 which introduces the supporting forces, which occur at the buffers 6, into the hood or trunk lid 5 over a large area.

A relatively large clearance C remains between the upper side of the housing 2 of the headlight and the lower side of the inner part 7, the clearance C being closed in a forwards direction of the vehicle by a wide and comparatively softly bending edge zone 5' of the engine hood or front trunk lid 5.

In the closed position of the engine hood or front trunk lid 5, the edge zone 5' engages over an edge region 4' of the lens 4, which region rises in a ramp-like manner towards the vehicle rear.

If, in the case of an accident, a pedestrian, in particular the head of a pedestrian, should strike against the engine hood or front trunk lid 5 in the region of the edge zone 5' or above the inner part 7, the engine hood or front trunk lid can, firstly, yield towards the inside of the hood or trunk lid under energy-absorbing deformation. Secondly, that edge of the edge zone 5' of the hood or trunk lid 5 which engages over the lens 4 can slide downwards over the lens 4, with the result that a reinforcement of the engine hood or front trunk lid 5 by being supported on the lens 4 or on the headlight is prevented to the greatest possible extent. The structurally predetermined deformation characteristics of the engine hood or front trunk lid can therefore virtually not be impaired by the headlights.

Figure 2:
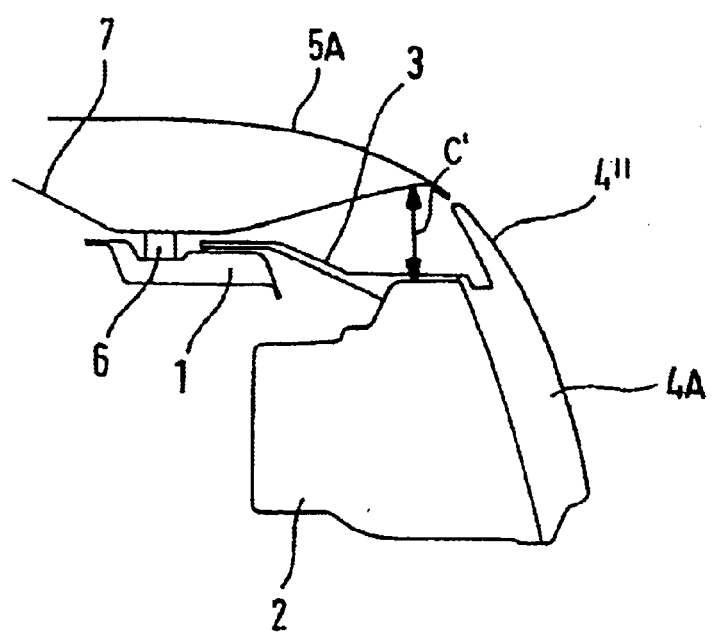
FIG. 2 shows a sectional drawing corresponding to FIG. 1 of a further embodiment of the invention.

The embodiment of FIG. 2 differs from the embodiment described above essentially by the clearance C, which is formed between the upper side of the housing 2 of the headlight and lower side of the inner part 7 of the engine hood or front trunk lid 5 and is intended for a possible deformation of the hood or trunk lid 5 in the forwards direction of the vehicle, being predominantly closed by a comparatively thin, upwardly drawn wall part 4" of the lens 4A.

If, in the case of an accident, a pedestrian should strike, particularly with his head, against the front region of the hood or trunk lid 5A, the front edge of the hood or trunk lid 5A can enter into the abovementioned clearance under energy-absorbing deformation without being obstructed by the lens 4A and/or the structure of the housing 2 of the headlight. The structurally predetermined deformation characteristics of the hood or trunk lid 5A also remain unchanged here because the front edge region of the hood or trunk lid 5A is arranged or designed without any support in the headlight region and can slide away along the inside of the wall part 4".

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A passenger vehicle assembly with a transition region between a headlight and front region of an engine hood or front trunk lid, which front region can be swung upwards, comprising:

a headlight housing which is arranged in front of and below a crossmember of a bodywork structure and is connected to the crossmember by a mount, a shell-like inner part in the front region of the hood or trunk lid above the crossmember which is supported in use on the crossmember via buffers, said shell-like inner part introducing supporting forces which occur at the buffers, into the hood or trunk lid over a large area, and a large clearance between a lower side of the inner part and upper side of the headlight housing, which clearance is closed to the front by one of (i) a wide and softly bending edge zone of the hood or trunk lid and (ii) a thin and easily destructible upwardly drawn wall part of a front cap of the headlight, in each case with the front edge of the hood or trunk lid and the headlight front adjoining each other without any support.

2. An assembly according to claim 1, wherein the headlight is arranged outside a zone which, in the case of a collision of the vehicle with a person or—in particular—a child, is more than likely to be acted upon by the person's or child's head.

3. An assembly according to claim 1, wherein a front side of the headlight forms a ramp which rises towards the vehicle rear.

4. An assembly according to claim 2, wherein a front side of the headlight forms a ramp which rises towards the vehicle rear.

5. An assembly according to claim 1, wherein the headlight front forms a ramp under a front edge of the engine hood or front trunk lid, which ramp rises towards the vehicle rear and on which the front edge of the hood or front trunk lid is able to slide downwards when being deformed, without significant impairment of the structurally predetermined deformation characteristics of the engine hood or front trunk lid.

6. An assembly according to claim 2, wherein the headlight front forms a ramp under a front edge of the engine hood or front trunk lid, which ramp rises towards the vehicle rear and on which the front edge of the hood or front trunk lid is able to slide downwards when being deformed, without significant impairment of the structurally predetermined deformation characteristics of the engine hood or front trunk lid.

7. An assembly according to claim 3, wherein the headlight front forms a ramp under a front edge of the engine hood or front trunk lid, which ramp rises towards the vehicle rear and on which the front edge of the hood or front trunk lid is able to slide downwards when being deformed, without significant impairment of the structurally predetermined deformation characteristics of the engine hood or front trunk lid.

8. An assembly according to claim 4, wherein the headlight front forms a ramp under a front edge of the engine hood or front trunk lid, which ramp rises towards the vehicle rear and on which the front edge of the hood or front trunk lid is able to slide downwards when being deformed, without significant impairment of the structurally predetermined deformation characteristics of the engine hood or front trunk lid.

9. A vehicle assembly comprising:

a vehicle light assembly disposed at a first end of a vehicle, a movable lid member disposed at the vehicle first end and having a lid member end region extending over the light assembly and being unsupported at the light assembly with a vertical clearance gap formed between the light assembly and the lid member, a vehicle bodywork cross member, and at least one support member interposed between the cross member and a downwardly facing shell section of the lid member to operably support the lid member in a closed position on a location spaced from the lid member end region extending over the light assembly, wherein the lid member end region is configured to be plastically deformable in a direction toward the light assembly with no structural support at the cross member or at the light assembly whereby pedestrian collision forces can be absorbed by the lid member end region without interference from the light assembly.

10. A vehicle assembly according to claim 9, wherein a vertical clearance gap is formed between a top of the light assembly and the lid member end region, said clearance gap accommodating downward deformation of the lid member end region.

11. A vehicle assembly according to claim 10, wherein said clearance gap is closed at a side of said first end of the vehicle by an extension of an easily deformable portion of the lid member end region.

12. A vehicle assembly according to claim 10, wherein said clearance gap is closed by easily deformable upwardly intruding cover part for the light assembly.

13. A vehicle assembly according to claim 9, wherein the lid member is a front engine hood member.

14. A vehicle assembly according to claim 10, wherein the lid member is a front engine hood member.

15. A vehicle assembly according to claim 11, wherein the lid member is a front engine hood member.

16. A vehicle assembly according to claim 12, wherein the lid member is a front engine hood member.

17. A vehicle assembly according to claim 9, wherein the lid member is a front trunk lid member.

18. A vehicle assembly according to claim 10, wherein the lid member is a front trunk lid member.

19. A vehicle assembly according to claim 11, wherein the lid member is a front trunk lid member.

20. A vehicle assembly according to claim 12, wherein the lid member is a front trunk lid member.

* * * * *